Jan. 19, 1932.  C. H. VIDAL  1,842,302
MECHANICALLY ACTUATED RECIPROCATING TOOL
Filed March 27, 1930  3 Sheets-Sheet 1
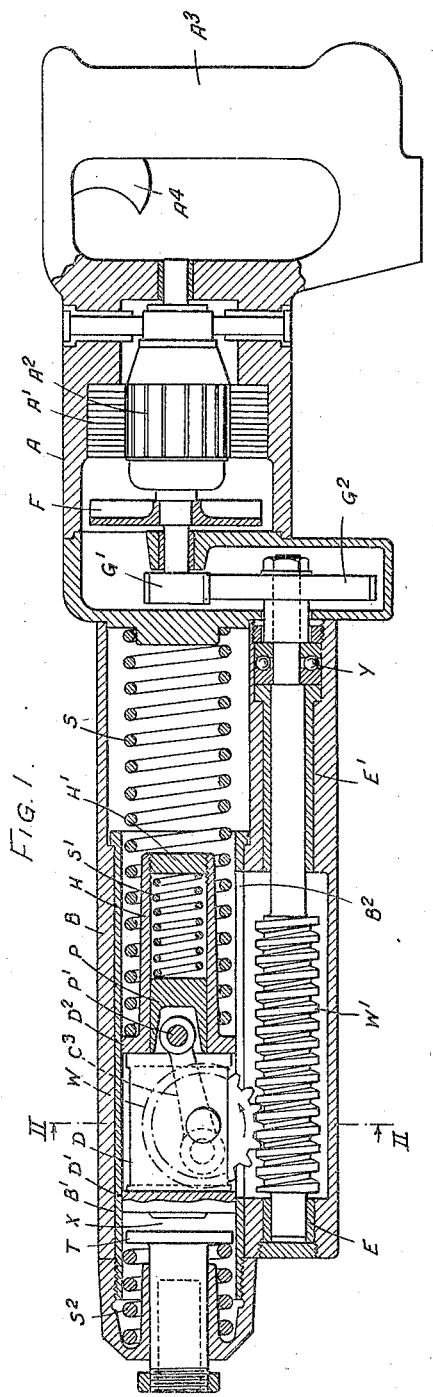
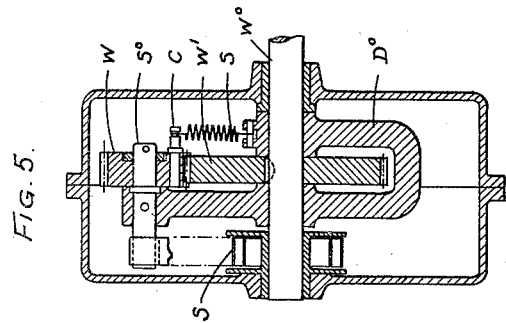
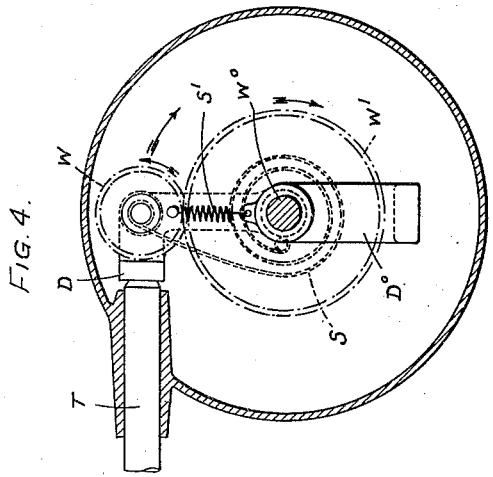
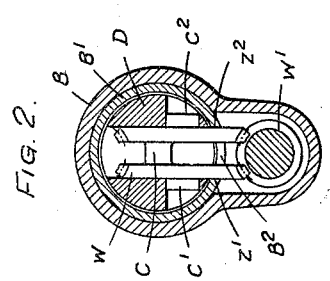
INVENTOR
Charles H. Vidal,
BY
ATTORNEY

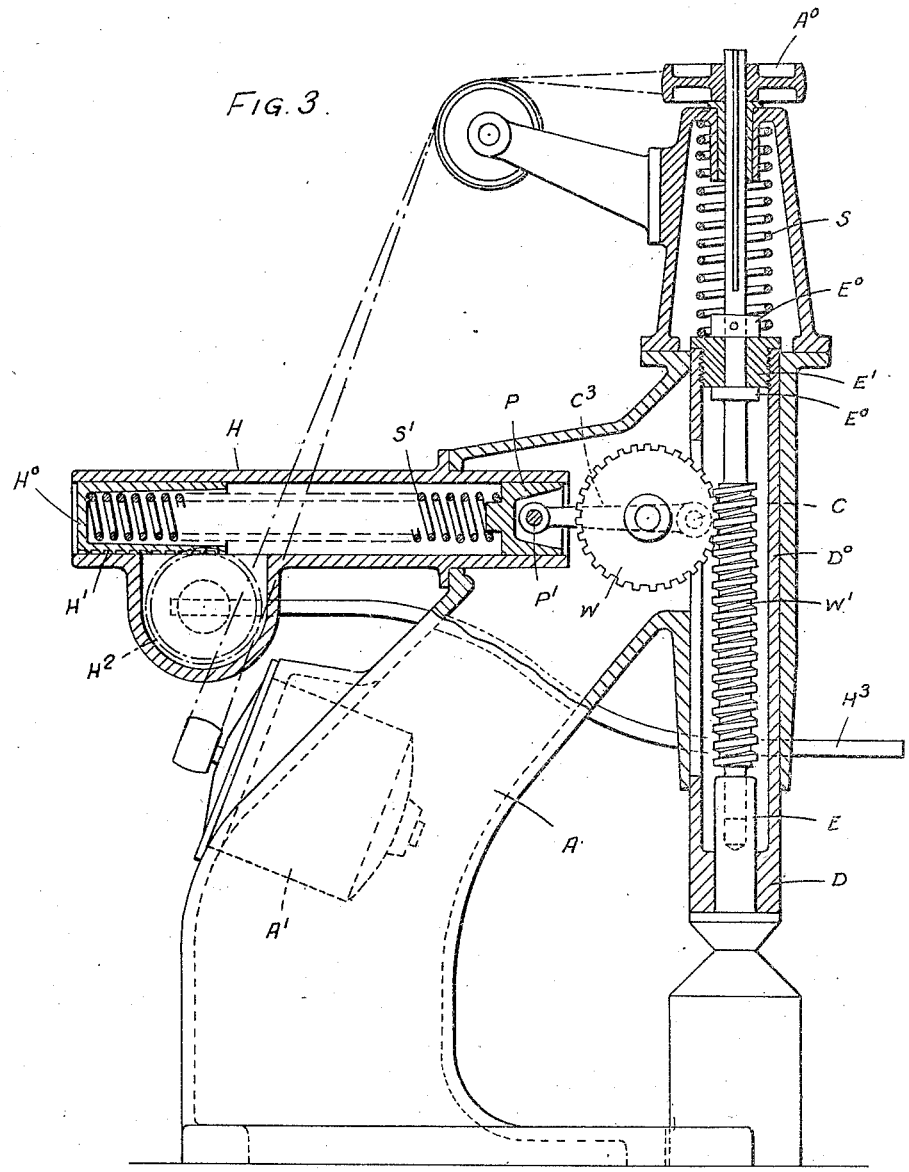

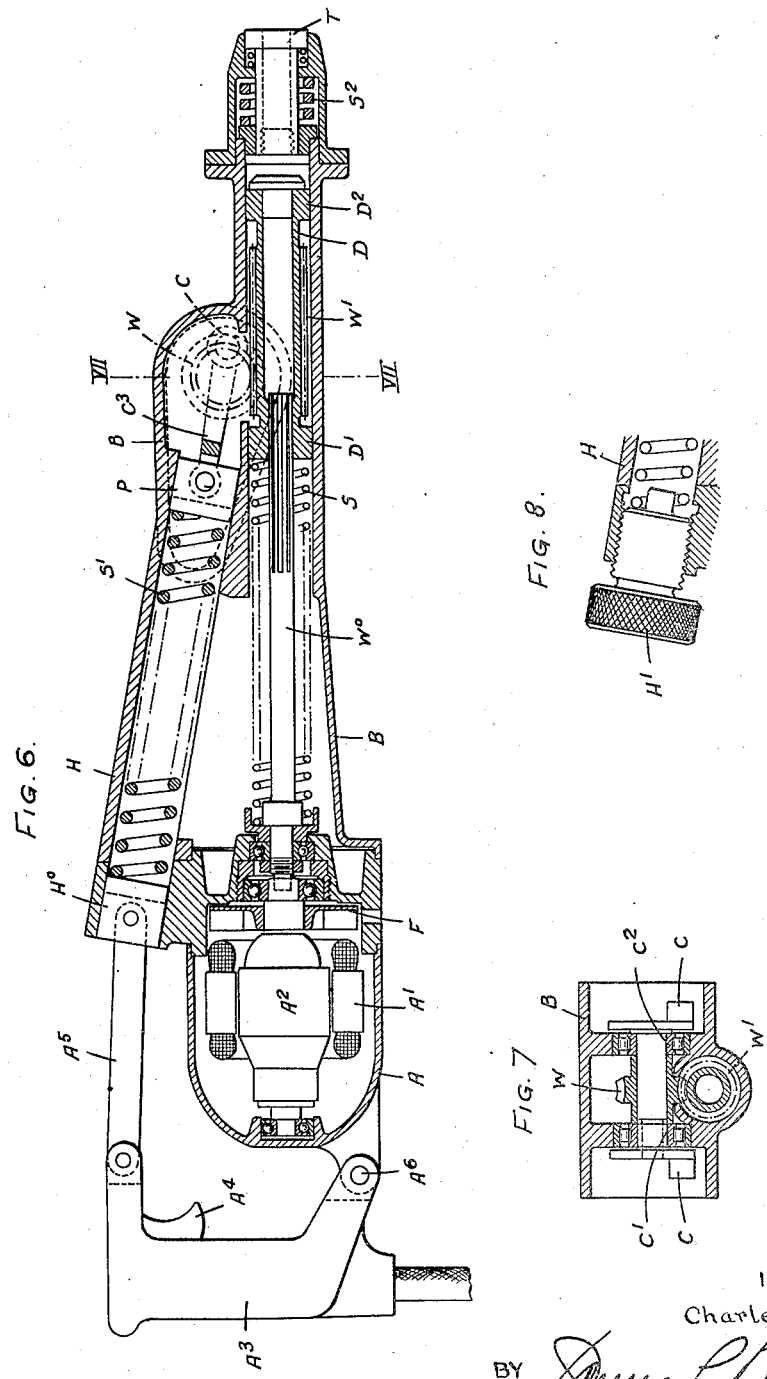

Patented Jan. 19, 1932

1,842,302

UNITED STATES PATENT OFFICE

CHARLES HENRY VIDAL, OF GERRARDS CROSS, ENGLAND

MECHANICALLY ACTUATED RECIPROCATING TOOL

Application filed March 27, 1930, Serial No. 439,362, and in Great Britain February 4, 1930.

This invention relates to mechanically driven reciprocating tools such as percussion drills, hammers, riveters and the like of the kind in which the energy required for striking the blow is accumulated in a spring or springs consequent on the relative rotation of two geared members one of which is continuously rotated from any suitable power source.

According to the present invention the resistance offered by a spring or springs to rotation of one of the pair of geared members causes one member to ride or roll along the other, and in so doing to accumulate energy in the spring or springs, this energy being released to strike the blow when one of the members passes through a position of unstable equilibrium which is reached simultaneously with the tensioning of the spring or springs to the maximum extent.

In one embodiment of the present invention, the action of the mechanism is controlled by a device, such as a worm wheel provided with a crank (or alternatively a cam or eccentric), connected with a subsidiary spring, the reaction of which is used to compress, and thus store additional energy in, a second spring which for convenience will be called the main spring and which furnishes part of the energy for driving the tup or striker. This device constitutes not only an energizing mechanism but also an automatic releasing mechanism by reason of the fact that the worm wheel, after being rotated through approximately 180° by a worm shaft driven from the source of power, during which rotation the full amount of energy is stored in both springs (main and subsidiary) and the tup has been moved to its extreme back position, rolls freely without shock along the worm shaft during the working stroke of forward movement of the tup, and the velocity of impact of the tup on the tool is limited only by the inertia of the parts concerned.

The same results may be obtained by substituting for the worm and worm wheel device equivalent mechanism, such as an endless chain in conjunction with an ordinary sprocket wheel operating as a crank, or by a reciprocating rack meshing with a gear wheel driven by the primary rotating power element.

In an apparatus according to the present invention oscillations due to rebound cannot damage the mechanism in any way, and it is possible to arrest the stroke of the tup at any point of its travel and hold it there for any length of time without straining the mechanism or overloading the motor or other source of power.

A further advantage of the apparatus is that it is not affected by variations in speed of the driving motor, each blow having exactly the same strength however the number of blows per unit time may vary in accordance with the speed of the driving motor, and it is possible therefore to operate the hammer perfectly satisfactorily over a wide range of speeds.

It will be seen that the use of ratchets, links, clutches or similar devices for interrupting the relation of the driving means with tup during working is obviated in mechanism according to the present invention, and that there is no lost motion at any time, so that during operation the mechanical parts are not subjected to abnormal shock or load.

One embodiment of the invention is illustrated by way of example in Figs. 1 and 2 of the accompanying drawings, wherein Fig. 1 is a longitudinal section of a mechanical hammer of a portable type driven by an electric motor, Fig. 2 being a section on line 2—2 of Fig. 1 looking in the direction of the arrows.

Figure 3 is an elevation, partly in section, of an embodiment of the invention as applied to a forge hammer.

Figures 4 and 5 are, respectively, central sectional views, in planes at right angles to one another, of a further embodiment of the invention.

Figure 6 is a longitudinal sectional view of a portable hammer or percussion tool containing a further embodiment of the invention.

Figure 7 is a section on the line VII—VII, Figure 6.

Figure 8 is a detail sectional view of a modified means for effecting initial compression of the subsidiary spring shown in Figure 7.

Within a casing A there is mounted an electric motor of any suitable type having an armature or rotor $A^2$ and a field magnet system A', the casing being preferably provided with a grip handle $A^3$ and a trigger switch $A^4$ controlling the operation of the motor. The motor drives, either directly or, as shown in Fig. 1, through suitable gearing G', $G^2$, a worm W' which is journalled in bearings E, E' supported in a casing B which serves to enclose all the working parts of the mechanism apart from the driving motor. A fan F on the motor shaft is made exceptionally heavy so as to function not only as a cooling fan but also as a flywheel to minimize variations in torque. The worm shaft is preferably provided with an end thrust bearing Y adapted to deal with end loads in both directions set up during operation.

Meshing with the worm W' is a worm wheel W, the journals C', $C^2$ of which have bearings formed in the tup or striker D and which projects through a slot $B^2$ in the casing B to engage the worm. A crank C on the worm wheel W is coupled by means of a connecting rod $C^3$ and pin P' with a piston P sliding in a cylinder H which is integral with or rigidly secured to the tup D. The latter has a free sliding fit in the casing B which preferably has a steel or cast iron liner B' providing a suitable wearing surface, since the casing itself for reasons of lightness would usually be made of aluminum.

Cooperating with the tup D, which is shown in Fig. 1 in its striking position, is a main storage spring S which is initially compressed between the tup and the fixed casing to an extent sufficient to avoid appreciable loss of power during the working extension.

In operation the worm W', which is continuously rotated by the driving motor so long as the latter is in action, rotates the worm wheel W in a counter-clockwise direction, as viewed in Fig. 1, this rotation being resisted by a spring S' which is compressed between the piston P and a plug H' closing the end of the cylinder H. The reaction of the spring S' is definitely proportioned to the reaction of the main spring S, having regard to the ratio between the radius of the crank C and the pitch diameter of the worm wheel W, so that the worm W' will, while tending to compress the subsidiary spring S' by means of the crank C, connecting rod $C^3$ and piston P, also push back the tup D, thus compressing and storing up energy in the main spring S, as well as in the subsidiary spring S' which, during the backward movement of the tup, will be compressed a proportionate amount. Backward movement of the tup and compression of the spring will continue until the crank C passes the dead center, i. e. after rotating through an angle of 180° from the position shown, whereupon the energy stored in the springs during the backward movement of the tup is automatically released and the two springs operate in unison to drive the tup forwardly to strike the blow, the worm wheel W rolling freely along the worm W' at a speed greatly in excess of its normal speed of travel due to rotation by the worm. The main spring S acts directly on the tup D, causing it to move forwardly with great velocity, but the subsidiary spring S' will also, by reaction through the worm wheel W, assist the main spring to urge the tup forwardly.

The blow of the tup will be taken by the transmitter or tool holder T when the tup reaches the point X, but should the hammer be operated without a tool, or should the resistance to the tup be insufficient to absorb the blow, then the tup will overrun its normal stroke and the blow will be absorbed by a buffer spring $S^2$, the reaction of which will cause the tup to rebound, thus returning energy to the striking mechanism and relieving the driving motor of the full duty of completing the next cycle, as would have been necessary if the energy of the blow had been fully absorbed by work done on the material which is being dealt with. It could be arranged for the main spring S to absorb the overrun of the tup D, but for convenience and to save space it is preferable to use a short buffer spring such as $S^2$ of greater strength, so that the overrun can be checked in a shorter distance.

It will be observed, moreover, that when the tup overruns its normal stroke, the crank C will rotate to a position beyond its normal initial position, as shown in Fig. 1, and in so doing will partly compress subsidiary spring S', thus imparting useful energy to the mechanism and reducing the power-consumption required to complete the succeeding cycle.

The tup has bearing or sliding surfaces D', $D^2$ and is prevented from turning about its own axis by the end faces of the worm wheel W which are constrained by but are free to turn or slide at the points Z', $Z^2$ in the slot $B^2$ provided in the liner B' to permit its longitudinal movement.

The casing B is partly filled with lubricating oil, so that all the working parts are thoroughly lubricated during operation, any suitable means being provided for filling the casing with the correct amount of oil. Oil leakage is prevented by the accurate fit of the transmitter T at the front of the hammer, while the long bearing E' on the driving end of the worm W' prevents escape of oil at this point. No leakage of oil is possible at any other point.

In principle and in its main features the construction of Fig. 3 does not differ from the construction of Fig. 1. The main difference is that the worm W' reciprocates with the tup D, while the worm wheel W is journalled in fixed bearings carried by the main frame or standard A of the hammer.

The worm shaft is splined in the boss of a pulley A°, so that, while it is rotated by the pulley, it is also free to slide through the pulley in the axial or longitudinal direction. The pulley A° may be driven by any suitable means, as by belting, from an electric motor A' mounted on the standard A.

The tup D has a hollow body or barrel D° which encircles the worm W' and which is slotted along one side to receive the worm wheel W and permit longitudinal movement of the tup.

The worm shaft is journalled in bearings E, E' at the two ends of the tup body and collars E° on the worm shaft embrace the bearing block E' so as to constrain the tup and worm shaft to move together longitudinally while permitting rotation of the shaft with respect to the tup which is guided so that it can only move longitudinally.

As in the case of Figures 1 and 2, a crank C on the worm wheel is connected by means of connecting rod C³ and pin P' with a piston P sliding in a cylinder H which in this case is stationary and which contains what has been called the subsidiary spring S'. The other spring S, which has been called the main spring, is compressed between the upper end of the tup body and the casing. It is to be understood, however, that one spring is just as important as the other in the operation of the hammer and the terms main and subsidiary are merely used to differentiate between them.

One end of the subsidiary spring S' abuts against the piston P, while the other end abuts against a follower plate or cap H° which can be moved longitudinally within the cylinder H, as by means of a rack H' on the outside of the cap and a pinion H² actuated by hand lever H³, thereby providing means for varying the initial compression of the spring.

In operation the continuously rotating worm W' drives the worm wheel W, but owing to the resistance of spring S' the rotation of the worm wheel is retarded and consequently the worm W' rides upwardly on the worm wheel and the spring S is consequently compressed. The upward movement of the tup and the compression of the springs S, S' will cease when the crank C passes the dead point, i. e. when it has been rotated through 180° in the clockwise direction from the position shown, and by varying the intial compression of the spring S' by means of the lever H³ the extent of the upward movement of the tup, i. e. the length of the stroke of the hammer, can be varied as desired.

When the crank C has passed the dead point, the rotation of the worm wheel will be accelerated beyond normal speed by the reaction of spring S', and the worm shaft and tup will be driven downwardly to strike a blow, the energy of which is contributed to by both spring S, S', as well as by the weight of the tup.

The variation in the length of the stroke of the tup may be controlled by a treadle instead of by the hand lever H³, and the cylinder H and its accessories may conveniently be accommodated within the hollow standard of the hammer.

In Figures 4 and 5 the tup D is shown as rigid with a swinging frame D° free on a shaft W° which is rotated continuously from any suitable source of power and which has keyed on it a spur wheel W' gearing with a pinion W. The latter is freely rotatable on a stub shaft S° which is pinned in one arm of the swinging frame D° and to which is attached one end of the main spring S which is in the form of a flat spiral spring contained within a fixed casing encircling the shaft W°.

The other arm of the swinging frame is connected by means of a helical spring S' with a crank pin C on the pinion W.

When the wheel W' is driven in the clockwise direction, as indicated in Fig. 4, the rotation of the pinion W in the counter-clockwise direction will be resisted by the spring S' and the pinion will therefore be carried around the shaft W° with the spur wheel W' in the clockwise direction and the tension of spring S' will be increased. Consequently, the swinging frame D° will be rocked upon the shaft W° in the same direction as the pinion is displaced and the tup D will be retracted from the transmitter or tool holder T. Simultaneously energy will be stored up in the main spring S.

The rolling movement of the pinion W on the spur wheel W' (and also the swinging movement of the frame D° on the shaft W°, unless the frame is arrested by a stop) and the tensioning of the springs will continue until the pinion, by rotation about its own axis in the counter-clockwise direction, has brought the crank pin C past the dead center, i. e. 180° from the position shown in Fig. 4, whereupon the energy stored in the springs operates to swing the frame D⁰ in the forward or counter-clockwise direction and the tup D delivers the blow to the transmitter or tool holder T.

In the embodiment of the invention shown in Figures 6 and 7 the worm shaft W⁰ is shown as splined into the tup D which is made hollow and carries the worm W' which gears with a worm wheel W journalled in the fixed frame B. The worm shaft W⁰ is shown as being driven directly by the electric motor A', A² which is enclosed in the casing A and has on its armature shaft a fan F which is made heavy so as to function also as a flywheel.

Cranks C on discs rigid with the worm wheel are coupled by connecting rods C³ with a piston P sliding in a cylinder or guideway H containing a spring S' which is adapted to be compressed between the piston and a slidable abutment H⁰. This slidable abutment is connected with the handle A³ by means of a link A⁵ and the handle is pivoted at A⁶ to the casing A. Pressure on the handle A³ toward the motor casing A tends to force the slidable abutment H⁰ forwardly to compress the spring S', so that the initial force of the spring (and consequently the force of the blow) is automatically increased as the tool is pressed against the work.

Other parts of the apparatus are designated by the same reference characters as the corresponding parts in the construction of Figs. 1 and 2.

In operation the tup and worm are continuously rotated in one direction, and, since the worm wheel is continuously in mesh with the worm, the wheel would be rotated continuously at the normal speed corresponding with the gear ratio if the spring S' were absent and nothing would happen. The resistance of the spring S', however, resists rotation of the worm wheel W, with the result that the worm W' travels backwardly relative to the worm wheel along the worm shaft in the manner of a rack and pinion, thereby compressing the main spring S. When the backward movement of the tup D is completed consequent upon the crank pins C having passed the dead point 180° from the position shown in Fig. 6, the tup D is driven forwardly under the action of the springs S, S' to strike a blow on the transmitter or tool holder T. During the forward movement of the tup it will, of course, also be rotating, and as the rotation of the worm wheel W is accelerated by the action of the spring S', the force of the latter assists that of the spring S in driving the tup forward.

Instead of varying the initial compression of the spring S' automatically according to the pressure applied to the handle A³, the latter may be fixed and the initial compression of the spring determined by a plug H' screwing into the end of the cylinder or guideway H, as shown in Figure 8. As previously explained in connection with the other embodiments of the invention, the variation of the initial compression of the spring S' has the effect of varying the power of the blow end, when no back-stop is used, varying also the length of the stroke.

It is obvious that in some of the constructions hereinbefore described more than one worm wheel (or the equivalent pinion) may be provided, each being subject to the control of a spring such as S', and when provision is made for the adjustment of these springs such provision may enable them to be independently adjusted, or to be simultaneously adjusted.

It is to be understood that any or all of the springs referred to in the various embodiments of the invention described above may be replaced by suitable mechanical equivalents such as a pneumatic cushion, or in some cases even by a weight. Indeed, the spring S, which has been called the main spring, could be eliminated altogether, and in this case a back stop (which may be a short spring buffer stop) is provided to arrest the backward stroke of the tup, the energy of the blow being in this case derived from the spring S'.

Having thus described the nature of the said invention and the best means I know of carrying the same into practical effect, I claim:—

1. A mechanical impact device of the character described, comprising a tup member, a power storage system which includes a spring, a continuously rotating shaft, two geared members driven therefrom, one of said members being movable to and fro with the tup member, and an eccentric device carried by one of the said geared members, said eccentric device being connected with said spring and operating to energize same upon rotation by the continuously rotating shaft of the geared member by which said eccentric device is carried.

2. A mechanical impact device of the character described, comprising a tup member, a continuously rotating shaft, two rotatable geared members driven therefrom, one of said geared members being movable to and fro with the tup member, a spring adapted to be energized during one period of the said movement, a second spring, an eccentric member on one of said rotatable geared members, and a device connecting the said eccentric with the said second spring and operating to energize the said second spring during a period of one half revolution of the said geared member about its axis.

3. A mechanical impact device of the character described, comprising a tup member, a power storage system which includes a spring, a continuously rotating shaft, two geared members driven therefrom, one of said members being movable to and fro with the tup member, an eccentric device carried by one of the said geared members and connected with said spring, and means for varying the initial set of said spring.

4. In a mechanical impact device the combination of a reciprocatable tup, yielding means constantly urging the tup in the striking direction, a driving element for retracting the tup against the action of said yielding means, and operative connections between the driving element and the tup, said connections comprising a thrust-abutment to receive the retracting force or its reaction, and a yielding toggle supporting said abutment adapted to give way under a predetermined pressure and let the tup advance freely.

5. A mechanical impact device as claimed in claim 4, wherein the thrust abutment is constituted by the meshing portion of a wheel geared with the driving element so as to be actuated thereby and the yielding toggle is constituted by a yielding link engaged with a crank on the gear wheel.

6. A mechanical impact device as claimed in claim 4, wherein the thrust abutment is constituted by the meshing portion of a wheel geared with the driving member so as to be actuated thereby and the yielding toggle is constituted by a spring-pressed connecting rod engaged with a crank on the gear wheel.

7. In a mechanical impact device the combination of a reciprocatable tup, yielding means constantly urging the tup in the striking direction, driving means for retracting the tup against the action of said yielding means, said driving means comprising a driving element having a meshing portion, a wheel geared with the meshing portion of the driving element so as to be actuated thereby, a crank on the gear-wheel and a yielding link which transmits retracting force from the crank to the tup and constitutes with the crank a yielding toggle so as to give way under a predetermined pressure and let the tup advance freely.

8. A mechanical impact device as claimed in claim 7 wherein the gear-wheel is itself mounted to reciprocate with the tup.

9. A mechanical impact device as claimed in claim 7 wherein the gear-wheel is mounted separately from the tup to rotate about a fixed axis and the driving element engages the tup on the one hand and the gear-wheel on the other to thrust the tup rearwardly relatively to the gear-wheel.

10. A mechanical impact device as claimed in claim 7 wherein the driving element comprises a rotatable worm set with its axis parallel to that of the movement of the tup, the gear-wheel is a worm wheel and one of these parts is disposed upon the tup to reciprocate therewith.

11. A mechanical impact device as claimed in claim 7 wherein the yielding link comprises a spring-pressed connecting rod.

In testimony whereof I have signed my name to this specification.

CHARLES HENRY VIDAL.